Jan. 1, 1929.
R. P. LANSING
1,697,395
VEHICLE SPRING CONTROLLING APPLIANCE
Original Filed Oct. 16, 1924     4 Sheets-Sheet 4
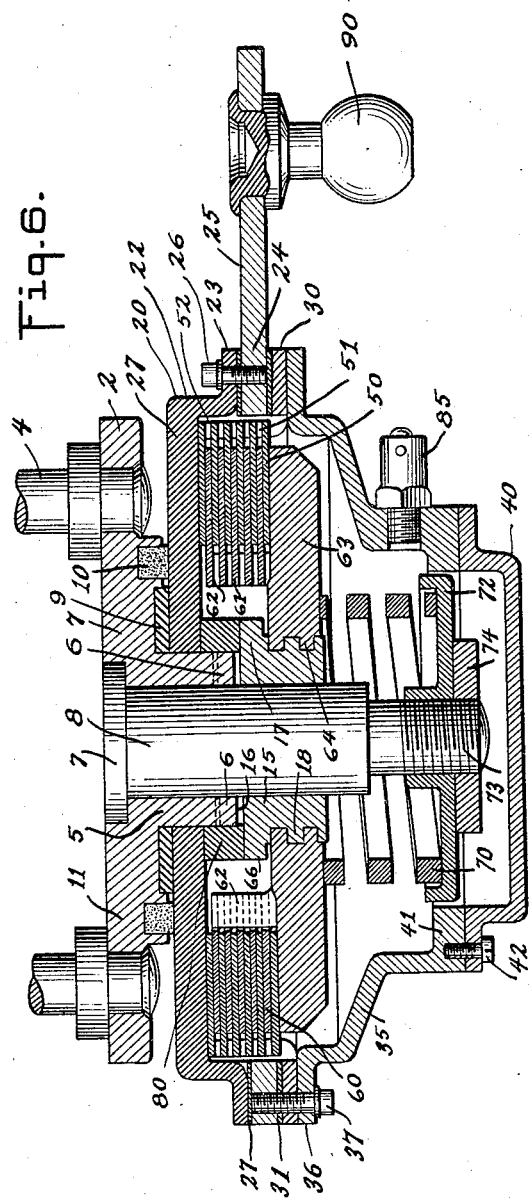
INVENTOR
Raymond P. Lansing
BY
ATTORNEY Patented Jan. 1, 1929.

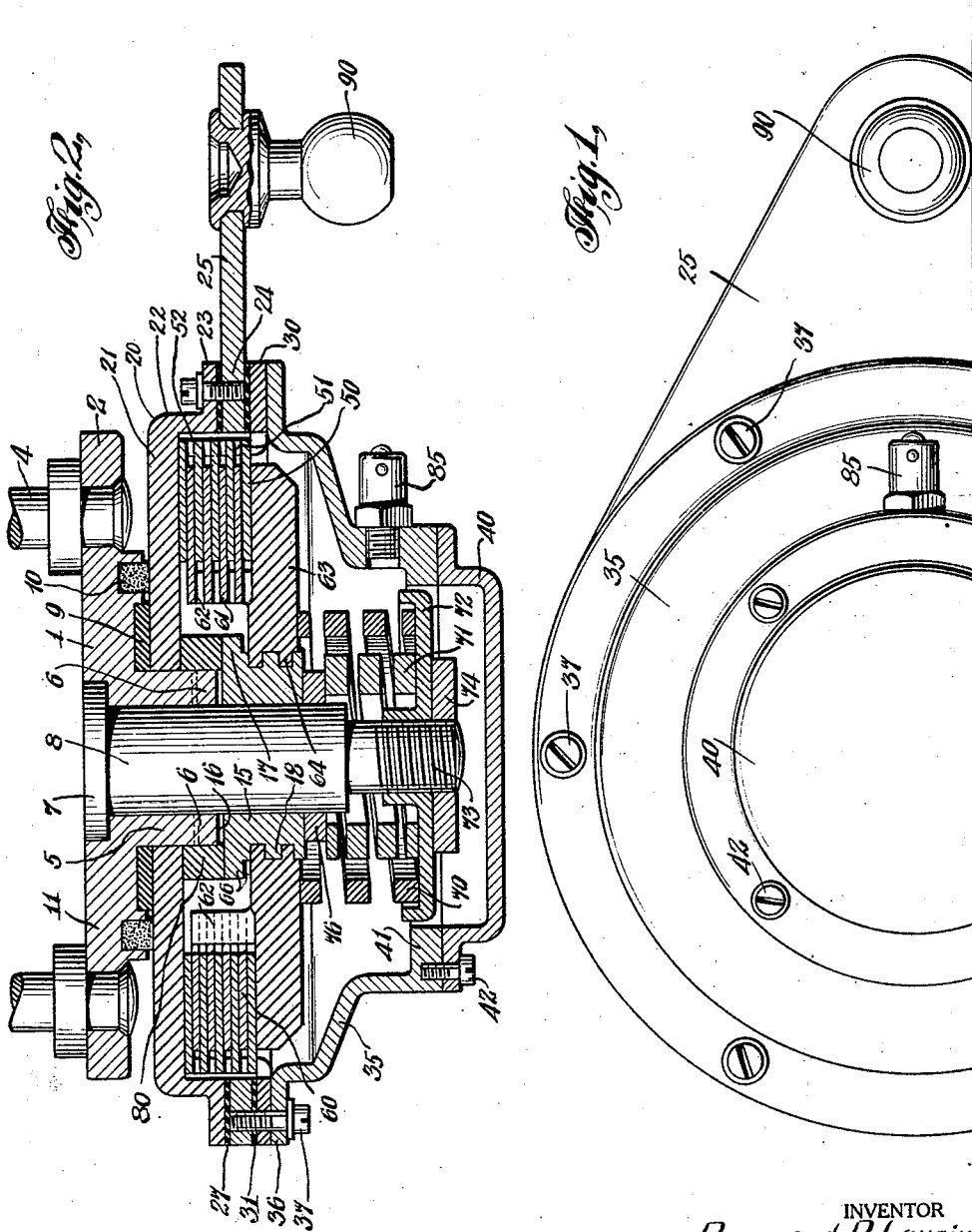

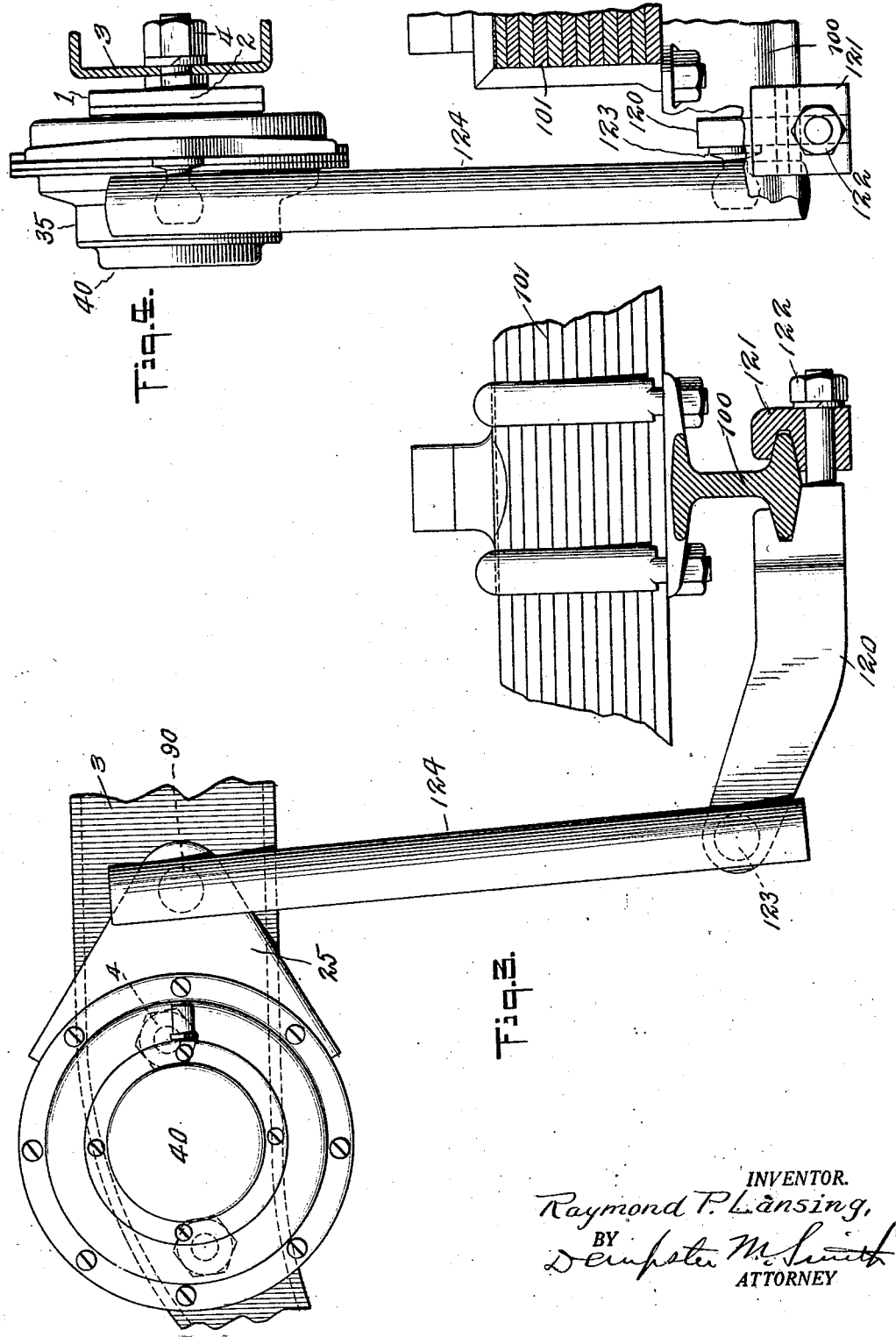

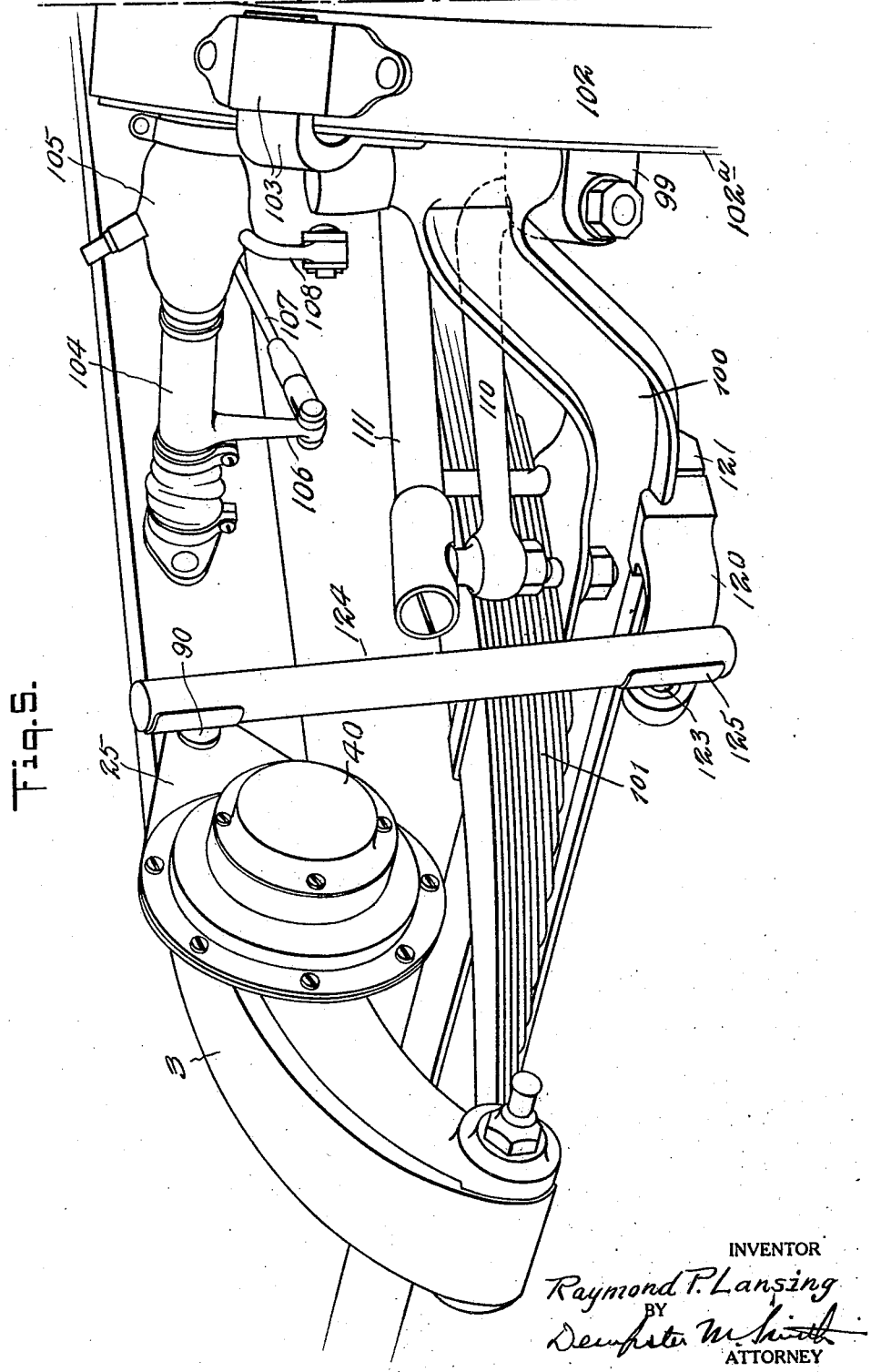

1,697,395

UNITED STATES PATENT OFFICE.

RAYMOND P. LANSING, OF MONTCLAIR, NEW JERSEY.

VEHICLE SPRING-CONTROLLING APPLIANCE.

Application filed October 16, 1924, Serial No. 743,923. Renewed October 9, 1928.

My invention relates to appliances for controlling the action or movement of vehicle springs, or spring-connected vehicle parts such as the frame and axles.

An important object of the invention is to provide a simple, strong and durable appliance of the friction type, which applies a predetermined maximum frictional resistance to the vehicle spring action in one direction of movement, this maximum resistance being applied very quickly after the beginning of the stated movement, and continuing to the end of the movement, the resistance to vehicle spring movement in the other direction usually being materially less and in some cases relatively small.

Another object is to allow for moderate relative vehicle body and axle movement, as when the vehicle is traveling over approximately smooth surfaces, by providing a comparatively small frictional resistance to such movements in either direction within a limited range, or, in some cases, practically or entirely eliminating resistance in such limited range.

A further object is to avoid any, or any considerable, resistance to return movement of the vehicle axle in relation to the body, after it has moved in one direction, and especially to avoid such resistance at the beginning of the return movement; and in attaining this object, the means employed may be such that instead of offering any resistance to the initiation of the return movement, such movement may be, and preferably is, actually facilitated.

A further object is to produce the above stated effects or results in an appliance in which the friction members have an oscillating or rotative movement about an axis, and further, to produce the friction effects by the action of yieldable means such as a spring or springs, in conjunction with an inclined member or surfaces, such as screw threads, which control or modify the spring action.

A more particular object is to provide an appliance in which the effective length or radius of one of the principal relatively-movable friction members may, when necessary or desirable, be made shorter than is usual in friction devices of this class, and to provide friction members or surfaces, pressure applying means and pressure controlling means especially adapted to the use of such a short lever arm. Especially, provision is made for a suitable multiplicity of friction surfaces, by providing a plurality of thin friction plates or discs, to give the proper retarding value in connection with a short lever arm or one of ordinary length, and also to permit lubrication of the friction surfaces while maintaining the desired retarding friction, and to keep the unit pressure on the friction surfaces sufficiently low to avoid "cutting" or undue wear whether lubrication is employed or not.

The provision of a structure having a short lever arm, with other suitable characteristics, as sufficiently explained above and hereafter, enables the shock absorbing appliance to be advantageously used in certain particular locations, for example, at the front end of a motor vehicle to control the action of the front vehicle spring, where the axle movement is relatively small, and therefore the short lever arm provides a sufficient range of movement when connected by a link to the front axle, without danger of excessive angularity which might produce a reversal of the normal arm and link relation, sometimes referred to as a "toggle" effect. The short lever arm furthermore permits the shock absorber to be advantageously used and properly mounted at the front end of a motor vehicle employing front wheel brakes, in which the brake drum or linkage, or steering connections, interfere with the proper installation of ordinary shock absorbers or those employing long lever arms.

The invention also includes a novel installation or arrangement of a shock absorber at the front end of a vehicle, the particular appliance employed in this installation usually having the short lever arm referred to above, the said installation or arrangement including the proper location of the appliance on a vehicle frame member, and the provision of an axle fitting or strut, and a connecting link, all arranged to avoid interference with the front wheel brake drum, or operating linkage, and steering connections, and at the same time to apply the proper retarding effect or control of the vehicle front springs.

While the invention is especially useful in connection with a short lever arm, it is not so limited, and its structural and operative principles are applicable to employment with lever arms of any usual or reasonable length.

A further important object is to provide for complete enclosure of all the principal moving or wearing parts of the appliance and especially all the main friction surfaces, so as to exclude dirt and moisture and effectively retain lubricant when it is desired to use a lubricant, not only for the purpose of lubricating the moving parts and reducing wear, but to maintain a sufficient body of lubricant to act as a cushioning medium and eliminate objectionable noise which is sometimes caused by certain of the moving parts in absence of a cushioning medium.

The present invention, as represented by the exemplifying embodiment shown, is in certain respects similar to my co-pending applications, Serial No. 713,532 and Serial No. 713,533, filed May 15, 1924, with important modifications and improvements, as sufficiently referred to above or explained hereafter.

The characteristics and advantages of the invention are further sufficiently explained in connection with the following detail description of the accompanying drawings, which show an exemplifying embodiment of the invention. After considering this embodiment, skilled persons will understand that many variations may be made, and I contemplate the employment of any structures that are properly within the scope of the appended claims.

Fig. 1 is a side elevation of a shock absorber embodying the invention in one form.

Fig. 2 is a horizontal section of the same.

Fig. 3 is a side elevation, showing a complete installation or arrangement for the location of such a shock absorber at the front end of a vehicle, without interference with the front-wheel brake drum or operating linkage.

Fig. 4 is an elevation of the same from the right of Fig. 3.

Fig. 5 is a perspective view from a front, left-hand position, of a motor vehicle having front wheel brakes and having a shock absorber installed in accordance with my invention, as illustrated in Figs. 3 and 4, in which most of the motor vehicle parts are omitted for the sake of clearness.

Fig. 6 is a sectional view, similar to Fig. 2, of a modified form of the shock absorber.

The shock absorbing appliance as shown in Figs. 1 and 2 is built on or around a base plate 1 having ears 2 arranged for rigid connection to a side frame member of a motor vehicle, such as 3, Fig. 3, by studs or bolts 4. The base plate has a short sleeve-extension 5 terminating in spaced lugs or jaws 6. Usually the spindle is separate from the base plate and has a head 7, located in a counterbore in the plate and is also provided with longitudinal teeth or corrugations 8 interfitting with similar formations in sleeve 5, although there is no considerable force tending to rotate the spindle.

An annular flat bearing ring 9 is located on the outer face of the base plate around sleeve 5. This ring may in some cases be of a material such as fibre, which has a definite though moderate friction co-efficient in contact with metal, or preferably in most cases the ring is formed of a suitable metal such as bronze, which has a still smaller friction co-efficient when in contact with such a metal as steel, and the ring 9 may in that case be considered principally as a thrust bearing or bearing seat for a part of the rotary structure described below. To entirely or substantially exclude dirt and water from the bearing face of ring 9, a compressible washer 10 of felt or other suitable material is located in a recess 11 surrounding the bearing ring.

A member 15, which may be conveniently designated as a shifter, or in some cases as a nut, is arranged with a close fit permitting endwise movement on the spindle, and the inner face end of this member is provided with spaced jaws 16 co-operating with jaws 6 of sleeve 5 to prevent rotation of the shifter. Adjacent the jaws 16 the shifter has a flange 17, and its outward cylindrical portion is provided with screw threads 18 of suitable fairly steep pitch, which may in a particularly instance be approximately 30 degrees.

A rotary structure is arranged for oscillation about the spindle. This includes an inner plate or casing member 20 comprising a plate portion 21 centrally apertured to provide a rotative bearing fit about sleeve 5, a shallow cylindrical portion 22, and a peripheral flange 23. The annular flat hub or plate portion 24 of a short lever arm 25 is secured to flange 23 by screws 26, having their heads inwardly located, and usually a gasket 27 is interposed between the plate and the flange to insure oil-tight connection of these parts. A flat annular member 30 is located against the outer face of plate 24. This member may be identified as a disc-connector, to co-operate with friction discs referred to hereafter. Usually a gasket 31 is interposed between the disc-connector and plate 24. An outer casing member 35 of generally dished form has a peripheral flange 36 located against the outer face of the disc-connector 30, and this flange, the disc-connector and plate 24 are secured together by screws 37 having their heads outwardly arranged. The arrangement of screws 26 and 37 above referred to, permits the outer portion of the rotary structure, including plate 24, the disc-connector and casing member 35, to be removed without disconnecting those parts, by merely removing screws 26; or the outer casing member may be removed without disturbing the disc-connector, plate 24 or the inner casing member 20, by removing screws 37.

A dished cap or cover 40 is detachably secured to a flange 41 of casing member 35 by screws 42.

Within the housing or casing of the rotary structure, including the parts above mentioned, are located any suitable plurality of friction discs 50, which are flat, thin annular discs of suitable metal, such as steel. These discs have peripheral spaced teeth 51 engaging between the spaced jaws or lugs 52 connected to the annular disc-connector 30 above mentioned, the jaws 52 being located near the inner periphery of the casing defined by cylindrical portion 22 or member 20, and the wall of the aperture in plate 24. Since the discs 50 are in this way connected so that they always move with the rotary structure, they may be conveniently identified as "rotor discs" or "rotor-connected discs". Interfitting between discs 50 are a suitable plurality of other friction discs 60, which have in their central apertures spaced teeth 61 interfitting with spaced lugs 62 extending from the inner face of a plate 63, which is conveniently identified as a "pressure plate" or member. This plate has in its central aperture screw threads 64 co-operating with shifter threads 18.

A moderate but definite clearance is provided, as at 66, between shifter flange 17 and the inner face of plate 63 for a purpose hereafter explained.

Yieldable means are provided for urging the various friction members to frictional contact, and for other purposes. Most conveniently this yieldable means consists of one or more springs, and in the present specific structure, two helical compression springs 70 and 71 are provided, arranged one within the other, and the outer ends of both of them bearing against an abutment which consists of a nut 72 adjustably screwed on the outward end 73 of the spindle and secured in adjusted position by a lock nut 74. Preferably spring 70 is of relatively moderate cross-section or in other ways is designed to have a moderate pressure value. Its inner end bears against the outer face of pressure plate 63. Spring 71 is of heavier cross section or in other ways is designed to have a very substantial pressure value, usually much greater than that of spring 72. The inner end of spring 71 may bear directly against the outer end of shifter 15, but preferably, as shown, a spacing washer 76 is provided to transfer the thrust of the heavy spring to the shifter. Both the springs are under substantial initial compression.

In some cases the inner end of the shifter may seat directly on the end of sleeve 5; but preferably, as shown, a cylindrical spacing ring 80 is interposed between the shifter and plate 21, so that shifter flange 17 seats against the outer end of this ring and sufficient clearance is provided in an endwise direction, to prevent definite seating of the shifter against the end of the sleeve.

Any known or suitable oil or grease nipple 85 is provided to facilitate introduction of a suitable lubricant such as heavy oil or grease into the rotary structure or casing; and specifically, in the present instance, this nipple is inserted through a side wall of casing member 35.

The lever arm 25 illustrated is relatively short, since the present appliance is especially adapted for location at the front end of a motor vehicle and especially for application to the front end of motor vehicles having front wheel brakes. But evidently, when necessary or desirable, the lever arm may be made of usual or average length or in fact as long as necessary to provide the necessary rotative movement without undue angularity.

At the end of the arm is any suitable device, such as a ball-end fitting 90, for connection to the vehicle axle.

The operation of the mechanism is in general similar to that of other shock absorbers of my invention, as shown and described in various pending applications, and companion applications executed on even date herewith, and is especially similar to the operation of the appliance disclosed in one of said companion applications. The operation will therefore be only briefly explained.

When the screw threads 18 and 64 have a right-hand lead, if arm 25 is moved counter-clockwise, or so that the end of the arm approaches the observer, as viewed in Fig. 2, the entire rotary structure moves together through the first small angle of arm movement, because of the frictional contact of the various members. A small or in some cases negligible resistance to this movement is provided by the contact of plate 21 with bearing ring 9 which usually has, as above stated, a small friction coefficient and is moreover of small average radius, so that although plate 21 is urged against the ring by the combined pressure of springs 70 and 71, the frictional resistance is small or negligible. When thread clearance is taken up the continued rotation of plate 63 causes, by the reaction of the screw threads, a slight outward movement of plate 63, which relieves the pressure on the faces of the interfitting friction discs 50 and 60. Plate 63 thereupon ceases to rotate, and in the further rotation of arm 25 to the end of the stated movement, frictional slippage occurs between all of the disc surfaces, this retarding force being applied to the vehicle axle through arm 25 and a link connection. This resistance is due only to the pressure of spring 70 which usually has a moderate value or one which is quite small in relation to the pressure of spring 71. Upon movement of arm 25 in the reverse direction, that is clockwise, or away from the observer, as viewed in Fig. 2, the rotary parts all move together through a short angle of arm movement, due to the frictional engagement of the discs, and during this movement the only resistance is that caused by movement of plate 21 in contact with ring 9. As soon as thread clearance is taken up, the further movement of plate 63 begins to "lift" or move shifter 15 outward away from its seat against spacer 80. Up to this time spring 71 has been inactive with relation to the friction discs 50 and 60, or in other words, has not exerted any pressure on the faces of the friction discs, since the thrust of this spring has been taken up between abutment 72 and spacer 80 which bears against plate 21. But as soon as the nut or shifter is lifted by the screw thread action the full pressure of spring 71 is brought to bear on the friction discs but no slippage occurs during this small angle of arm movement, which may be conveniently identified as a "wind-up" or spring-compression movement, continuing until the clearance 66 is taken up. The resistance to arm movement, however, during this wind-up period is increased to the extent of the effort required to additionally compress the spring. When the clearance 66 is taken up flange 17 strikes the inner face of plate 63, the plate is locked against further rotation, and slippage then occurs between all of the engaging disc faces and continues to the end of the stated arm movement, the frictional resistance being of a value proportional to the sum of the pressures of both of the springs, and being of relatively high value to provide a very substantial resistance to axle movement.

The appliance may be arranged in an obvious way to oppose the greatest resistance either to vehicle spring compression or recoil.

Fig. 6 shows a modified form of the shock absorber, which is substantially the same as the structure shown in Fig. 2, similar parts being similarly identified, with the omission of the inner spring 71 and spacer 76, shown in Fig. 2. There is also, in Fig. 6, a greater number of friction discs in each of the cooperative sets, although the number of friction discs may evidently, in either form of the device, be varied in accordance with other features of design or the use for which the device is intended. The single pressure spring 70 may be substantially the same as shown in connection with Fig. 2, that is, it may have the same pressure value, or in some cases the pressure value of the spring may be increased. In any case, the spring pressure and number of friction discs are so calculated as to provide the necessary retarding effect for the purpose in view, without the employment of an additional spring, such as the inner spring 71 of Fig. 2. The frictional retarding effect may be increased to any reasonable extent, with a spring 70 of any reasonable pressure value, by merely increasing the number of discs.

With the screw threads 18 and 64 having a right hand lead, as in the previous example, when the lever arm 25 moves clockwise (or the ball 90 moves toward the eye of the observer in Fig. 2), if the shifter 15 has previously been moved outward, it will be moved inward during the first part of the arm movement, with no resistance, until flange 17 engages the outer face of spacer 80. There is thus provided a small angle of completely free movement at the beginning of the stated arm movement, which, according to the usual application of the device in a motor vehicle, corresponds to the vehicle spring compression movement. At the end of the free period, further movement of the pressure plate 63, impelled frictionally by the discs, causes the engaging screw threads to move or urge the pressure plate slightly outward against the pressure of spring 70, thus relieving the effective spring pressure on the disc surfaces until slippage occurs, and this friction effect of reduced value continues to the end of the stated arm movement. When the arm moves in the opposite direction, (usually corresponding to vehicle spring recoil) the discs and plate 63 at first move together by reason of their frictional contact through a small angle of arm movement without any resistance, since during this time the shifter 15 is merely moved outward by the action of the screw threads. This free motion at the beginning of a substantial vehicle spring recoil, prevents any abrupt or premature application of retarding force. The stated condition continues until flange 17 strikes the inner face of plate 63, whereupon the plate is locked against further rotation and frictional slippage occurs with an effect due to the full force of spring 70, and as above stated, the frictional retarding effect may be made as great as desired with any given or reasonable spring pressure, by providing a suitable number of friction discs. When the vehicle is running over comparatively smooth roads, the slight jiggle of the vehicle springs causes only a slight angular movement of arm 25 in either direction, and there is no appreciable resistance to such spring movement, and in fact, in most cases, there is no measurable resistance, since the movement of arm 25 under such conditions is not sufficient to move shifter 15 out far enough to cause its flange 17 to lock against plate 63, or inward far enough to strike against the spacer 80; the shifter therefore moves idly to and fro, and there is no slippage at the friction surfaces and no appreciable, or absolutely no, retarding effect applied to the lever arm.

While the shock absorbing appliance may obviously be attached to vehicle parts in various ways, to control the action of either the front or rear vehicle springs, an important advantage of the invention, as embodied in the present and similar forms, is that it can be advantageously applied to motor vehicle front ends, and especially to motor vehicles having front wheel brakes, where heretofore it has been very difficult or impossible to apply shock absorbers of a true friction type and in fact on account of the difficulty of making proper shock absorber installations, it has generally been found necessary to use spring controllers of the strap, recoil-checking type, commonly known as recoil snubbers. Figs. 3, 4 and 5 show the shock absorber of Figs. 1 and 2, or 6, applied in one representative and approved fashion to the front end of a motor vehicle of standard construction, provided with front wheel brakes.

Fig. 5 shows the left-hand front steering knuckle 99 pivotally mounted at one end of the axle 100, turned at a substantial angle to enable other parts to be easily observed. The wheel (not shown) carries the front brake drum 102$^a$ having an outside brake band 102 secured to a circular web or flange on the steering knuckle by clips or supports such as 103. The brake is operated by a shaft 104 supported at one end on the left chassis frame member 3, and at the other end on the circular brake web by a universal joint enclosed in a boot 105. Shaft or sleeve 104 has an arm 106 connected by a link 107 to the brake pedal, with or without interposed equalizing mechanism. Another arm 108 is connected by a suitable linkage to a brake operating lever (not shown) located on the circular brake flange and suitably connected to the brake band 102. The steering arm 110 is secured to knuckle 99 and by means of a ball and socket connection, the usual drag link 111 is connected to the end of the steering arm, the rear end of the drag link being connected to the end of the lever forming a part of the steering gear, as usual. The front spring 101 has its front end secured by means of a bolt in the front end of frame member 3, which is curved down to form a spring horn as usual. When the front wheel is provided with brake mechanism, including a drum 102$^a$, which must be of very substantial diameter to provide the proper brake effect, the wheel steering arm 110 and the drag link 111, must be particularly proportioned or arranged; especially, in order to clear the brake drum and other brake parts when the wheel is turned at a substantial angle to the left, as shown in Fig. 5, and in order to provide sufficient steering leverage, arm 110 must be longer than usual, and the drag link 111 must be located more nearly in the vertical plane of the chassis side frame member 33, than is necessary or customary in vehicles that are not provided with front brakes. The brake operating shaft and other connections, such as 104, 106 and 107, also located substantially above or extending rearward from the vertical plane of the axle, together with the stated drag link location, prevent the application of a friction shock absorber in the usual location, which is against the vertical web of the chassis side frame member 3 to the rear of the axle, with the lever arm extending forward and secured to the axle by a substantially vertical link, which in such cases would be located inwardly with respect to the drag link 111. In accordance with the present invention, to avoid conflict with the brake mechanism and steering connections, including the drag link 111, the shock absorber is located forwardly on the side frame member 3, quite near the front end of that member or on the curved portion leading down to the point of connection with the front end of spring 101. Specifically, the base plate 1 is secured by means of the bolts 2 and nuts, to the vertical web of the frame member 3 in a forward position, as clearly shown in Fig. 5, and with the lever arm 25 extending rearward. This location of the shock absorber, together with the fact that a short lever arm is preferably provided for the front end location, brings the rear end of the arm carrying the ball fitting 90, well forward of the vertical plane of the axle, and out of the way of the brake operating and steering connections, including parts 104, 106, 107, 111, etc. To provide for the proper connection of the ball fitting 90 with the axle 100, an arm or strut 120 is provided, secured to the lower horizontal flange of the axle by a clamp member 121, bolts and nuts 122. The strut 120 is desirably curved slightly upward, as it extends forward, and is long enough to amply clear the axle, the brake drum and band, steering arm 110 and the front end of the drag link 111 in any of the different positions of these parts; and is also long enough to be located substantially vertically below the ball fitting 90 of lever 25. The end of the strut is provided with a similar ball fitting 123, connected to ball fitting 90 by a link 124 provided with suitable sockets to receive the balls, the socket bearings being preferably shielded by plates 125. The described arrangement of shock absorber connections obviously brings the connecting link 124 well forward and out of the way of steering drag link 111, and so that there is no necessity for the connecting link 124 passing down between the normal vertical plane of the drag link and that of the frame member 3, the clearance at that point, as above stated, being too small to permit the proper location of the shock absorber connecting link when the drag link 111 and other parts are properly arranged for front wheel braking.

Various other arrangements or installations of the shock absorber may be made, at the rear end of the vehicle, or at the front end when front brakes are not employed and the arrangement of the steering connections makes it possible to locate the shock absorber in one of the ordinary positions, as for example, substantially back of the vertical plane of the axle.

I claim:

1. A vehicle spring controller comprising relatively revoluble structures adapted to be connected respectively to vehicle parts such as the frame and axle, two sets of interfitting friction discs, the discs of one set being connected to rotate with one of said structures, a revoluble intermediate member, the discs of the other set being connected to revolve with said member, and yieldable pressure means and an inclined element co-operating with the intermediate member.

2. A vehicle spring controller comprising relatively revoluble structures adapted to be connected respectively to vehicle parts such as the frame and axle, two sets of interfitting friction discs, the discs of one set being connected to rotate with one of said structures, an intermediate member revoluble in relation to both said structures, the discs of the other set being connected to revolve with said member, and means comprising a yieldable pressure device and an inclined element for producing pressure on the engaging faces of the discs and varying the pressure effect in different directions of relative movement of the revoluble structures.

3. A vehicle spring controller comprising relatively revoluble structures adapted to be connected respectively to vehicle parts such as the frame and axle, two sets of interfitting friction discs, the discs of one set being connected to rotate with one of said structures, a revoluble intermediate member, the discs of the other set being connected to revolve with said member, and means comprising a yieldable pressure device, a shiftable member and an inclined element for producing pressure on the engaging faces of the discs and varying the pressure effect in different directions of relative movement of the revoluble structure.

4. A vehicle spring controller comprising relatively revoluble structures adapted to be connected respectively to vehicle parts such as the frame and axle, two sets of interfitting friction discs, the discs of one set being connected to rotate with one of said structures, a revoluble intermediate member, the discs of the other set being connected to revolve with said member, an inclined element co-operating with said intermediate member and yieldable pressure means co-operating with said member, said inclined member and pressure means co-operating to produce different pressure effects on the friction surfaces in different relative movements of said revoluble structures.

5. A vehicle spring controller comprising relatively revoluble structures adapted to be connected respectively to vehicle parts such as the frame and axis, two sets of interfitting friction discs, the discs of one set being connected to rotate with one of said structures, a revoluble intermediate member, the discs of the other set being connected to revolve with said member, an axially movable shifter secured against rotary movement, co-operating inclined surfaces on said shifter and intermediate member, and yieldable pressure means, the shifter, intermediate member and inclined surfaces co-operating with the pressure means to produce different friction pressures in different directions of relative movement of the revoluble structures.

6. A vehicle spring controller comprising relatively revoluble structures adapted to be connected respectively to vehicle parts such as the frame and axle, two sets of interfitting friction discs, the discs of one set being connected to rotate with one of said structures, a revoluble intermediate member, the discs of the other set being connected to revolve with said member, a spindle at the rotative axis of said revoluble structures, a shifter arranged for axial movement on the spindle and secured against rotation, the intermediate member and shifter being connected by inclined surfaces admitting rotative movement of the intermediate member in relation to the shifter, and yieldable pressure means for exerting pressure on the intermediate member, the action of said means being modified by rotative movement of the intermediate member.

7. A vehicle spring controller comprising relatively revoluble structures adapted to be connected respectively to vehicle parts such as the frame and axle, two sets of interfitting friction discs, the discs of one set being connected to rotate with one of said structures, a revoluble intermediate member, the discs of the other set being connected to revolve with said member, a spindle at the rotative axis of said revoluble structures, a shifter arranged for axial movement on the spindle and secured against rotation, the intermediate member and shifter being connected by inclined surfaces admitting rotative movement of the intermediate member in relation to the shifter, means for limiting rotation of the intermediate member in one direction in relation to the shifter, and yieldable pressure means for exerting pressure on the intermediate member, the action of said means being modified by rotative movement of the intermediate member.

8. A vehicle spring controller comprising relatively revoluble structures adapted to be connected respectively to vhicle parts such as the frame and axle, two sets of interfitting friction discs, the discs of one set being connected to rotate with one of said structures, a revoluble intermediate member, the discs of the other set being connected to revolve with said member, a spindle at the rotative axis of said revoluble structures, a shifter arranged for axial movement on the spindle and secured against rotation, the intermediate member and shifter being connected by screw threads admitting rotative movement of the intermediate member in relation to the shifter, means preventing further rotation of the intermediate member in relation to the shifter after moderate relative movement in one direction, and yieldable means for exerting pressure on the intermediate member, the action of said means being modified by rotative movement of the intermediate member.

9. A vehicle spring controller comprising relatively revoluble structures adapted to be connected respectively to vehicle parts such as the frame and axle, two sets of interfitting friction discs, the discs of one set being connected to rotate with one of said structures, a revoluble intermediate member, the discs of the other set being connected to revolve with said member, a spindle at the rotative axis of said revoluble structures, a shifter arranged for axial movement on the spindle and secured against rotation, the intermediate member and shifter being connected by inclined surfaces admitting rotative movement of the intermediate member in relation to the shifter, yieldable pressure means for exerting a pressure effect on the shifter, the intermediate member and shifter co-operating to vary the effect of said pressure means to the disc surfaces in different directions of movement.

10. A vehicle spring controller comprising relatively revoluble structures adapted to be connected respectively to vehicle parts such as the frame and axle, two sets of interfitting friction discs, the discs of one set being connected to rotate with one of said structures, a revoluble intermediate member, the discs of the other set being connected to revolve with said member, a spindle at the rotative axis of said revoluble structures, a shifter arranged for axial movement on the spindle and secured against rotation, the intermediate member and shifter being connected by inclined surfaces admitting rotative movement of the intermediate member in relation to the shifter, yieldable pressure means for exerting a pressure effect on the shifter, the intermediate member and shifter co-operating to vary the effect of said pressure means to the disc surfaces in different directions of movement, and to eliminate the effect of said pressure means in one direction of movement.

11. A vehicle spring controller comprising relatively revoluble structures adapted to be connected respectively to vehicle parts such as the frame and axle, two sets of interfitting friction discs, the discs of one set being connected to rotate with one of said structures, a revoluble intermediate member, the discs of the other set being connected to revolve with said member, a spindle at the rotative axis of said revoluble structures, a shifter arranged for axial movement on the spindle and secured against rotation, the intermediate member and shifter being connected by inclined surfaces admitting rotative movement of the intermediate member in relation to the shifter, and yieldable pressure means for exerting pressure on the intermediate member, and yieldable pressure means for exerting a pressure effect on the shifter.

12. A vehicle spring controller comprising a friction member adapted to be connected to one of two vehicle parts such as the frame or axle, a spindle extending therefrom, a rotary structure adapted for movement about the spindle axis and adapted for connection to the other vehicle part, two sets of interfitting friction discs, the discs of one set being connected irrevolubly to the rotary structure, a pressure member movable in relation to the rotary structure and connected irrevolubly to the discs of the other set, a shifter arranged for axial movement on the spindle, and connected to the first named friction member to prevent rotation of the shifter, interfitting screw threads on the shifter and said pressure member, and a spring compressed between an abutment on the spindle and said pressure member.

13. A vehicle spring controller comprising a friction member adapted to be connected to one of two vehicle parts such as the frame or axle, a spindle extending therefrom, a rotary structure adapted for movement about the spindle axis and adapted for connection to the other vehicle part, two sets of interfitting friction discs, the discs of one set being connected irrevolubly to the rotary structure, a pressure member movable in relation to the the rotary structure and connected irrevolubly to the discs of the other set, a shifter arranged for axial movement on the spindle, and connected to the first named friction member to prevent rotation of the shifter, interfitting screw threads on the shifter and said pressure member, and a spring compressed between an abutment on the spindle and the shifter.

14. A vehicle spring controller comprising a friction member adapted to be connected to one of two vehicle parts such as the frame or axle, a spindle extending therefrom, a rotary structure adapted for movement about the spindle axis and adapted for connection to the other vehicle part, two sets of interfitting friction discs, the discs of one set being connected irrevolubly to the rotary structure, a pressure member movable in relation to the rotary structure and connected irrevolubly to the discs of the other set, a shifter arranged for axial movement on the spindle, and connected to the first named friction member to prevent rotation of the shifter, interfitting screw threads on the shifter and said pressure member, a spring compressed between an abutment on the spindle and said pressure member, and a spring intermediate an abutment on the spindle and the shifter.

15. A vehicle spring controller comprising a friction member adapted to be connected to one of two vehicle parts such as the frame or axle, a spindle extending therefrom, a rotary structure adapted for movement about the spindle axis and adapted for connection to the other vehicle part, two sets of interfitting friction discs, the discs of one set being connected irrevolubly to the rotary structure, a pressure member movable in relation to the rotary structure and connected irrevolubly to the discs of the other set, a shifter arranged for axial movement on the spindle, and connected to the first named friction member to prevent rotation of the shifter, interfitting screw threads on the shifter and said pressure member, and a spring compressed between an abutment on the spindle and said pressure member, the shifter and pressure member having co-operating means admitting only limited rotation of the pressure member in one direction.

16. A vehicle spring controller comprising a friction member adapted to be connected to one of two vehicle parts such as the frame or axle, a spindle extending therefrom, a rotary structure adapted for movement about the spindle axis and adapted for connection to the other vehicle part, two sets of interfitting friction discs, the discs of one set being connected irrevolubly to the rotary structure, a pressure member movable in relation to the rotary structure and connected irrevolubly to the discs of the other set, a shifter arranged for axial movement on the spindle and connected to the first named friction member to prevent rotation of the shifter, interfitting screw threads on the shifter and said pressure member, and a spring compressed between an abutment on the spindle and the shifter, the shifter and intermediate or pressure member having co-operating means admitting only limited rotation of the intermediate or pressure member in one direction.

17. A vehicle spring controller comprising a friction member adapted to be connected to one of two vehicle parts such as the frame or axle, a spindle extending therefrom, a rotary structure adapted for movement about the spindle axis and adapted for connection to the other vehicle part, two sets of interfitting friction discs, the discs of one set being connected irrevolubly to the rotary structure, a pressure member movable in relation to the rotary structure and connected irrevolubly to the discs of the other set, a shifter arranged for axial movement on the spindle, and connected to the first named friction member to prevent rotation of the shifter, interfitting screw threads on the shifter and said pressure member, a spring compressed between an abutment on the spindle and said pressure member, and a spring intermediate an abutment on the spindle and the shifter, the shifter and intermediate or pressure member having co-operating means admitting only limited rotation of the intermediate or pressure member in one direction.

18. A vehicle spring controller comprising a main or base plate adapted to be connected to a vehicle part such as a frame member, a spindle extending therefrom, a rotary structure having a bearing against said base plate and arranged for rotation about the spindle axis, two sets of interfitting friction discs, an irrevoluble connection between the discs of one set and the rotary structure, a pressure member within the rotary structure connected irrevolubly to the discs of the other set, a shifter arranged for axial and non-rotative movement on the spindle, screw threads connecting the shifter and pressure member, a flange on the shifter spaced slightly from the pressure member and serving as a stop to limit rotation thereof in relation to the shifter, and yieldable pressure means acting between the spindle and the pressure member to create friction pressure and also serving to urge the revoluble structure to contact with said bearing.

19. A vehicle spring controller comprising a main or base plate adapted to be secured to a vehicle part such as a frame member, a spindle extending therefrom, a rotary structure having a bearing against said base plate and arranged for rotation about the spindle axis, two sets of interfitting friction discs, each set including a plurality of discs, an irrevoluble connection between the discs of one set and the rotary structure, a pressure member within the rotary structure connected irrevolubly to the discs of the other set, a shifter arranged for axial and non-rotative movement on the spindle, screw threads connecting the shifter and pressure member, a flange on the shifter spaced slightly from the pressure member and serving as a stop to limit rotation thereof in relation to the shifter, and yieldable pressure means acting between the spindle and the shifter to create friction pressure and also serving to urge the revoluble structure to contact with said bearing.

20. A vehicle spring controller comprising a main or base plate adapted to be connected to a vehicle part such as a frame member, a spindle extending therefrom, a rotary structure having a flat surface of substantial area engaging against a surface of said base plate to form a thrust bearing, said structure being arranged for rotation about the spindle axis, two sets of interfitting friction discs, an irrevoluble connection between the discs of one set and the rotary structure, a pressure member within the rotary structure connected irrevolubly to the discs of the other set, a shifter arranged for axial and non-rotative movement on the spindle, screw threads connecting the shifter and pressure member, a flange on the shifter spaced slightly from the pressure member and serving as a stop to limit rotation thereof in relation to the shifter, and yieldable pressure means acting between the spindle and the pressure member and shifter to create friction pressure and also serving to urge the revoluble structure to contact with said bearing seat.

21. A vehicle spring controller comprising a base plate, a spindle thereon, a structure mounted for rotation about the spindle and including a plurality of friction disks, an actuator arranged for axial movement of the spindle and secured against rotation, a pressure plate having screw threaded engagement with the actuator and cooperating with the friction disks, and a single spring acting between the spindle and the pressure plate to produce friction pressure.

Signed at Hoboken in the county of Hudson and State of New Jersey this third day of October, A. D. 1924.

RAYMOND P. LANSING.